United States Patent [19]
Xie

[11] Patent Number: 5,960,015
[45] Date of Patent: Sep. 28, 1999

[54] TWO MODE AMPLITUDE-STABLE INTRACAVITY-DOUBLED LASER AND METHOD

[75] Inventor: Ping Xie, San Jose, Calif.

[73] Assignee: Uniphase Corporation, San Jose, Calif.

[21] Appl. No.: 08/924,185

[22] Filed: Sep. 5, 1997

[51] Int. Cl.⁶ ..................................................... H01S 3/10
[52] U.S. Cl. ............................................. 372/22; 372/21
[58] Field of Search ................ 372/21, 22; 350/326–328

[56] References Cited

U.S. PATENT DOCUMENTS 5,164,947  11/1992  Lukas et al. .
5,446,749  8/1995  Nighan, Jr. et al. .

OTHER PUBLICATIONS

M.J.F. Digonnet and C.J. Gaeta, Theoretical analysis of optical fiber laser amplifiers and oscillators, Feb. 1, 1985, Applied Optics.

G.D. Boyd and D.A. Kleinman, Parametric Interaction of Focused Gaussian Light Beams, Jul. 1968, Journal of Applied Physics.

Michio Oka and Shigeo Kubota, Stable intracvity doubling of orthogonal linearly polarized modes in diode–pumped Nd: YAG lasers, Oct. 1988, Otpics Letters.

*Primary Examiner*—Leon Scott, Jr.
*Attorney, Agent, or Firm*—Steve Shear; Mike Pritzkau

[57] ABSTRACT

A two-mode, amplitude-stable laser is disclosed which provides two-mode operation (i.e., two fundamental lasing modes of similar, but distinct frequencies), resulting in low noise output at harmonic frequencies of the fundamental mode frequencies. An associated method is also disclosed. A nonlinear material is positioned in the path of lasing light for converting light from fundamental frequencies to particular harmonic frequencies of those fundamental frequencies such that the fundamental frequencies incur a nonlinear loss. The nonlinear material establishes the nonlinear loss at a level which is greater than the linear loss within the cavity such that two of the fundamental frequencies lase while unwanted fundamental frequencies are extinguished. A two-mode criterion is introduced which ensures two-mode laser operation. A stability criterion is also introduced which cooperates with the two-mode criterion in a way which provides a high level of beam output intensity stability.

18 Claims, 3 Drawing Sheets

TWO MODE AMPLITUDE-STABLE INTRACAVITY-DOUBLED LASER AND METHOD

BACKGROUND OF THE INVENTION

The present invention relates generally to multi-mode lasers and more particularly to a multi-mode laser implementation and associated method which provides amplitude-stable, quiet operation.

Various schemes for multi-mode operation of intracavity-doubled lasers have been implemented in the prior art. However, a multi-mode intracavity-doubled laser which exhibits stable amplitude operation has been more difficult to consistently attain. Such amplitude stability is generally expressed as a percentage of root-mean-square (RMS) output beam power. Interest in multi-mode, amplitude-stable lasers arises from applications such as laser spectroscopy and laser printing.

One approach in designing a stable intracavity-doubled laser relies on the presence of a relatively large number of longitudinal modes. As an example, a diode-pumped, multiaxial mode, intracavity doubled laser with high amplitude stability (i.e., less than 3% RMS output beam power) is disclosed in U.S. Pat. No. 5,446,749. In this particular approach, low noise operation is achieved by using a long laser cavity, which yields a multiplicity (50 to 100) of longitudinal modes, thus resulting in an averaging effect whereby to reduce the total noise in the resulting sum average of the output signal.

Another approach attempts to provide stable operation by limiting the number of longitudinal modes present in the laser cavity. One implementation is described by M. Oka and S. Kubota (Opt. Lett. 13, 805, 1988) wherein quarterwave plates are inserted into the laser cavity, thus forcing the laser to operate in orthogonally polarized modes. This method of operation reduces the frequency sum generation process of the fundamental, thus stabilizing the laser output. However, this approach works only with nonlinear media which obeys Type II phase-matching conditions. Moreover, the additional intracavity elements lead to increased losses and a more complex overall structure.

Still, another approach for reducing the number of longitudinal modes is described in U.S. Pat. No. 5,164,947 wherein the laser is forced into single-mode operation by using a twisted-mode technique to eliminate spatial holeburning, thus reducing the output noise. Additionally, two quarterwave plates and a polarizer are positioned within the laser cavity in this approach. At first appearance the single longitudinal mode laser may seem to provide an advantageous method of achieving low noise operation. Unfortunately, however, SLM laser operation is generally attained at the price of much reduced output power. Specifically, unwanted modes are extinguished by the configuration of the laser. In many applications, certain ones of these extinguished modes represent useful energy. The SLM laser also shares at least one disadvantage of Oka and Kubota's approach in that additional intracavity components are required to extinguish the unwanted modes, thus leading to additional intracavity losses and a generally more complex structure.

In view of the foregoing, there remains a need for an amplitude-stable, intracavity frequency multiplied laser that does not require active cavity stabilization or additional intracavity elements, yet produces low noise output in multiple modes, specifically two modes. The present invention provides a heretofore unseen approach and associated method for producing a two mode, amplitude-stable, intracavity-doubled laser which is suitable for use in low noise applications.

SUMMARY OF THE INVENTION

As will be described in more detail hereinafter, a two-mode, amplitude-stable laser implementation is disclosed which provides two-mode operation (i.e., two fundamental lasing modes of similar but distinct frequencies), resulting in low noise output at harmonic frequencies of the fundamental mode frequencies. An associated method is also disclosed.

The two-mode laser implementation includes an input and an output mirror defining a resonant cavity of a predetermined length and a light path within the resonant cavity and between the mirrors such that light traveling along the path is subjected to a linear loss. In addition, the implementation includes a laser gain medium positioned in the light path, substantially centered at a point between the mirrors, for producing light at two fundamental frequencies and at other, unwanted fundamental frequencies. A nonlinear material is also positioned within the light path for converting light from the fundamental frequencies to particular harmonic frequencies of those fundamental frequencies such that the fundamental frequencies incur a nonlinear loss. The nonlinear material is configured for establishing the nonlinear loss at a level which is greater than the linear loss such that two of the fundamental frequencies lase while unwanted fundamental frequencies are extinguished.

In one aspect of the invention, the laser gain medium is excited by a pumping source and the nonlinear material includes a nonlinear doubling coefficient which is defined as the ratio of second harmonic power over the square of fundamental power. Two-mode operation of the laser is ensured by designing the laser such that the nonlinear doubling coefficient is greater than $$\frac{2\delta_0^2}{\eta \cdot P_{pump}},$$

where $\delta_0$ is the percentage linear loss incurred by the light at the fundamental frequencies, $\eta$ is an extraction efficiency and $P_{pump}$ is the power of the pump beam supplied by the pump light source.

In another aspect of the invention, the nonlinear material includes a nonlinear doubling coefficient which establishes the nonlinear loss. Stable operation (i.e., low noise at the output harmonic frequencies) of a two-mode laser, as provided, for example, by the foregoing aspect, is ensured by further designing the laser such that the nonlinear doubling coefficient is less than $$\frac{\tau_c \cdot (1 + \beta'_{21}) \cdot \sigma}{h \cdot v \cdot \pi \cdot w^2}$$

so, that the produces an output beam at the harmonics which includes an intensity variation of less than 3% RMS, where $\tau_c$ is the cavity lifetime, $\beta'_{21}$ is a cross saturation coefficient dependent upon the location of the gain material along the light path, for example $\beta'_{21}=0.333$ when the gain medium is in the center of the cavity, $\beta'_{21}=0.666$ when the gain medium is at the end of the cavity, $\sigma$ is the gain cross-section of the laser gain medium, h is Planck's constant, v is an average frequency of the fundamental frequencies, and w is the average beam radius of the light at fundamental frequencies at a position where the light enters the nonlinear material.

BRIEF DESCRIPTION OF THE DRAWINGS

The present invention may be understood by reference to the following detailed description taken in conjunction with the drawings briefly described below.

DETAILED DESCRIPTION OF THE INVENTION

Figure 1:
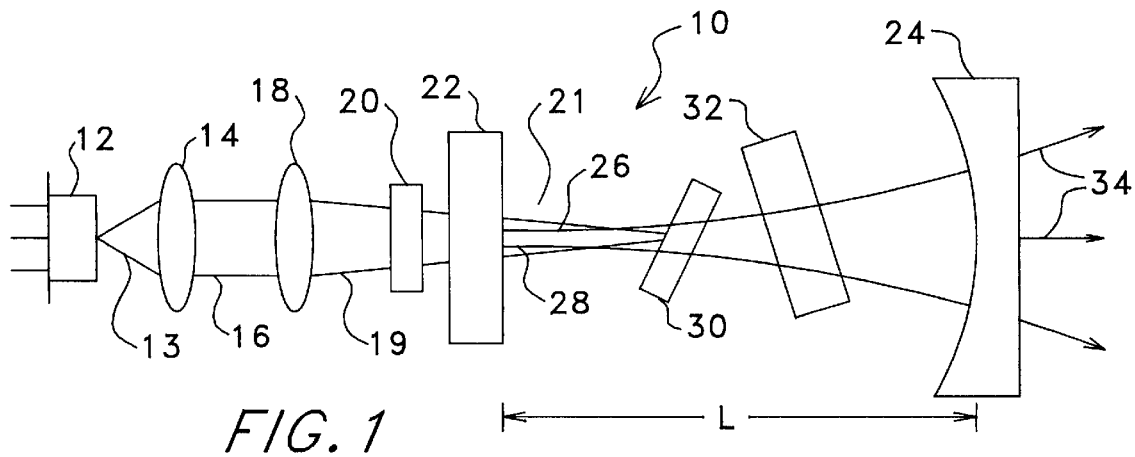
FIG. 1 is a diagrammatic illustration of a laser manufactured in accordance with the present invention configured for operating as a two-mode amplitude-stable intracavity-doubled laser.

Attention is immediately directed to FIG. 1, which illustrates one embodiment of a two-mode laser manufactured in accordance with the present invention and generally indicated by the reference numeral 10. It should be noted that like components in the drawings are designated by like reference numerals throughout the various figures. Laser 10 includes a pumping fight source 12, which emits light 13 at a predetermined frequency. Light 13 is directed into a collimating lens 14. Upon emerging from this latter element, light 13 forms a beam 16. Thereafter, beam 16 is incident upon a lens 18 and is focused on laser active material 30 to form a beam 19. Light beam 19 passes through a color filter 20 and, thereafter, into a resonant cavity 21 having a length L that is defined between an input mirror 22 and an output mirror 24. As will be further described, beam 19 is absorbed in laser active material 30, exciting laser oscillation within the resonant cavity. The oscillating laser beam has a Gaussian beam profile 26 with a beam radius 28 defined by resonant cavity 21.

Still referring to FIG. 1, input mirror 22 is designed to be highly transmissive to focused light 19 while, at the same time, being highly reflective to a range of fundamental lasing frequencies (i.e., light emitted by laser gain medium 30 in response to focused light 19). Similarly, output mirror 24 is also designed to be highly reflective to the fundamental lasing frequencies and highly transmissive to certain harmonics of the fundamental lasing frequency, for example, the second harmonic of the fundamental frequencies, as will be described at an appropriate point below. A laser gain medium 30 and a nonlinear material 32 are positioned within cavity 21, as will be described in further detail at appropriate points hereinafter. It is noted that all intracavity optical surfaces are preferred to be inclined at a small angle (tilt) off normal to the cavity axis so as to minimize coupled cavity and intracavity etalon effects.

During operation of laser 10, an output beam 34 is emitted from laser 10 at the aforementioned harmonics of the fundamental lasing frequencies in a known manner, as will be further described. For the moment, it is sufficient to note that characteristics of output beam 34 are dependent upon the materials used for laser gain medium 30 and nonlinear material 32 in conjunction with their positions, the properties of pump beam 16, and resonant cavity length L. The fundamental and harmonic frequencies can vary depending upon the specific materials used as the laser gain medium and nonlinear material in the laser configuration. For purposes of simplicity, the remaining discussion will consider the use of Nd:YVO$_4$ as the laser gain medium with a central fundamental wavelength of 1064 nm, and KTP as a nonlinear material, generating second harmonics (532 nm) of the fundamental wavelengths. However, with the application of the principles described below, the use of materials for the laser gain medium and nonlinear material other than Nd:YVO$_4$ and KTP will be clear to those of skill in the art in view of this overall disclosure.

Still referring to FIG. 1, pumping light source 12 is arranged such that pump light beam 16 passes through a collimating lens 14 and a focusing lens 18 for optical coupling to laser gain medium 30 after passing through input mirror 22. Pumping light source 12 may be provided in a variety of different forms so long as it produces or emits pump beam 16 at a predetermined frequency which is matched to the laser transitions of the material used as the laser gain medium, as is well known. Focused beam 19, when directed into laser gain medium 30, excites atomic laser transitions within the laser gain medium and causes the material to lase, thereby producing the predetermined fundamental frequencies as well as other, unwanted frequencies inside resonant cavity 21. In one embodiment, a laser diode which emits light at or about the absorption peak of the gain medium 30 is used as pumping light source 12. In the case of Nd:YVO$_4$, the absorption is at 809 nm. As is well known in the art, laser diodes of this type are readily available.

Figure 2:
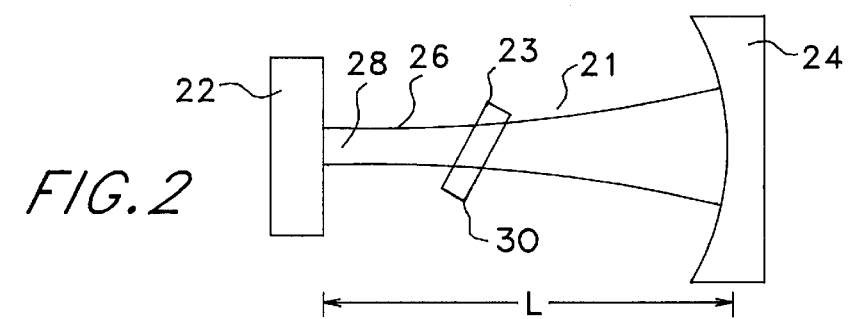
FIG. 2 is a simplified diagrammatic illustration of a resonant cavity of the laser illustrating optimal positioning of the laser gain medium within the laser cavity in the lasing light path.

Attention is now directed to FIG. 2, which is a simplified diagram showing only resonant cavity 21 and certain associated components. It is important to note that laser gain medium 30 is positioned substantially centered within the resonant cavity along length L which is defined as effective optical distance between input mirror 22 and output mirror 24.

Figure 3:
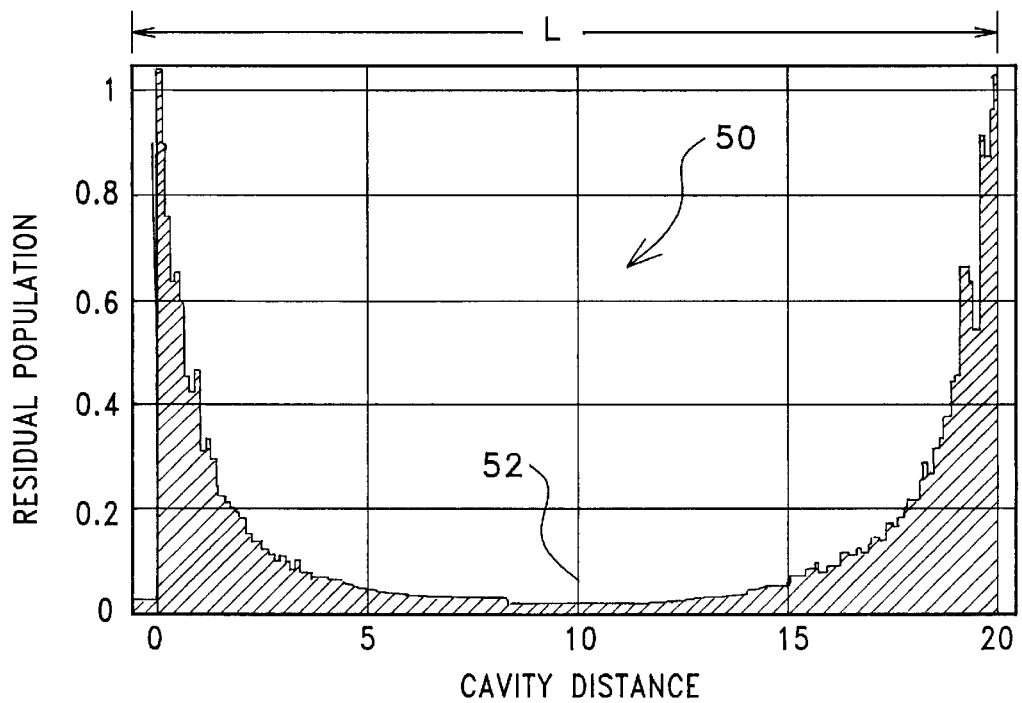
FIG. 3 is a graphical plot illustrating a normalized residual atomic population burned by the two adjacent longitudinal laser fundamental frequencies versus the distance along the cavity length (mm), thus demonstrating the optimal positioning of the laser gain medium within the laser cavity in the light path.

Referring to FIG. 3 in conjunction with FIG. 2, it should be noted that centered placement of laser gain medium 30, as indicated above, can be understood using a plot 50 of the residual atomic population (along the vertical axis) burned by two adjacent longitudinal laser mode versus distance (along the horizontal axis) within resonant cavity 21 along length L. It is readily apparent that the residual population is minimal at a center point 52 along the length of the resonant cavity, hence spatial hole-burning can be minimized if laser gain medium 30 is substantially centered along length L of cavity 21. In other words, centering gain medium 30 in the cavity leaves minimal gain for any additional 3rd mode to oscillate. The minimization of spatial hole burning cooperates with inventive features yet to be described which limit the operation of the laser to two modes.

Referring again to FIG. 1, so as to achieve two-mode operation of laser 10 in accordance with the present invention, the nonlinear loss must be greater than the linear loss. The latter is incurred by the fundamental frequencies (both desired and unwanted) as determined, for example, by the properties of the coatings on the input and output mirrors, absorption characteristics of the materials selected for the laser gain medium and nonlinear material, anti-reflection coatings on the laser gain medium and nonlinear material. In contrast, the amount of nonlinear loss (equating to the amount of fundamental frequency light which is converted to harmonics) incurred by the fundamental frequencies depends on properties of the material which is selected for use as the nonlinear material. More specifically, the nonlinear loss is determined by the doubling coefficient of nonlinear material. As will be described in further detail, the doubling coefficient of a given nonlinear material can be adjusted by changing the length of the nonlinear material along the path of light passing therethrough. When the nonlinear loss dominates the loss mechanism of the laser, the two already oscillating nodes will introduce substantial loss to any 3rd mode through sum frequency generation and suppress the 3rd mode from oscillating.

In accordance with the present invention, the condition that the nonlinear loss must be greater than the linear loss can be satisfied by imposing a highly advantageous and heretofore unused, to applicant's knowledge, and unknown condition (hereinafter referred to as a two-mode criterion) which is expressed as:

$$\epsilon > \frac{2\delta_0^2}{\eta \cdot P_{pump}} \quad (1)$$

where $\epsilon$ is the doubling coefficient of nonlinear material 32 and is defined as second harmonic power divided by square of fundamental power, $\delta_0$ is the linear loss incurred by the light at the fundamental frequencies, in which $\eta$ is an extraction efficiency (which is equal to the product of $\eta_Q \cdot \eta_S \cdot \eta_B \cdot \eta_A$ in which $\eta_Q$ is the quantum efficiency, which is defined as the number of photons contributing to laser emission divided by the number of pump photons, $\eta_S$ is the Stokes factor which represents the ratio of the photon energy emitted at the laser transition to the energy of a pump photon, $\eta_B$ is defined by an overlap integral between the pump and resonator mode distribution, (M. J. F. Digonnet, C. J. Gaeta: Appl. Opt. 24, 333, 1985) and $\eta_A$ is the absorption efficiency which is defined by the percentage absorbed power in the laser gain medium out of the total pump power) and $P_{pump}$ is the power of the pump beam supplied by the pump light source. Remarkably, when the two-mode criterion is satisfied in conjunction with previously described design considerations, the laser will lase at only two desired fundamental frequencies and, consequently, produce an output light beam 34 at only two harmonic frequencies such as, for example, doubled frequencies and a summed frequency with respect to the two lasing doubled frequencies.

It should be appreciated that, for a given value of linear loss, quantum efficiency of the laser gain medium, and pump beam power, the right hand side of the inequality in Equation 1 is a constant. In accordance with one design protocol, the doubling coefficient of nonlinear material 32 may be enhanced in a known manner by increasing the length of the nonlinear material along length L such that more light of fundamental frequencies is converted to light at harmonic frequencies due to increased interaction with the nonlinear material. However, increased length of nonlinear material may also lead to complications such as, for example, unnecessarily narrow frequency, temperature and angular acceptance bandwidth. Hence, the length of nonlinear material should be selected such that the inequality in Equation 1 is satisfied without considerably narrowing the phasematching acceptance bandwidth. With regard to this particular protocol, it is to be understood that, irrespective of the manner in which the two-mode criterion is satisfied, two mode operation at the desired fundamental frequencies will be attained.

Figure 4:
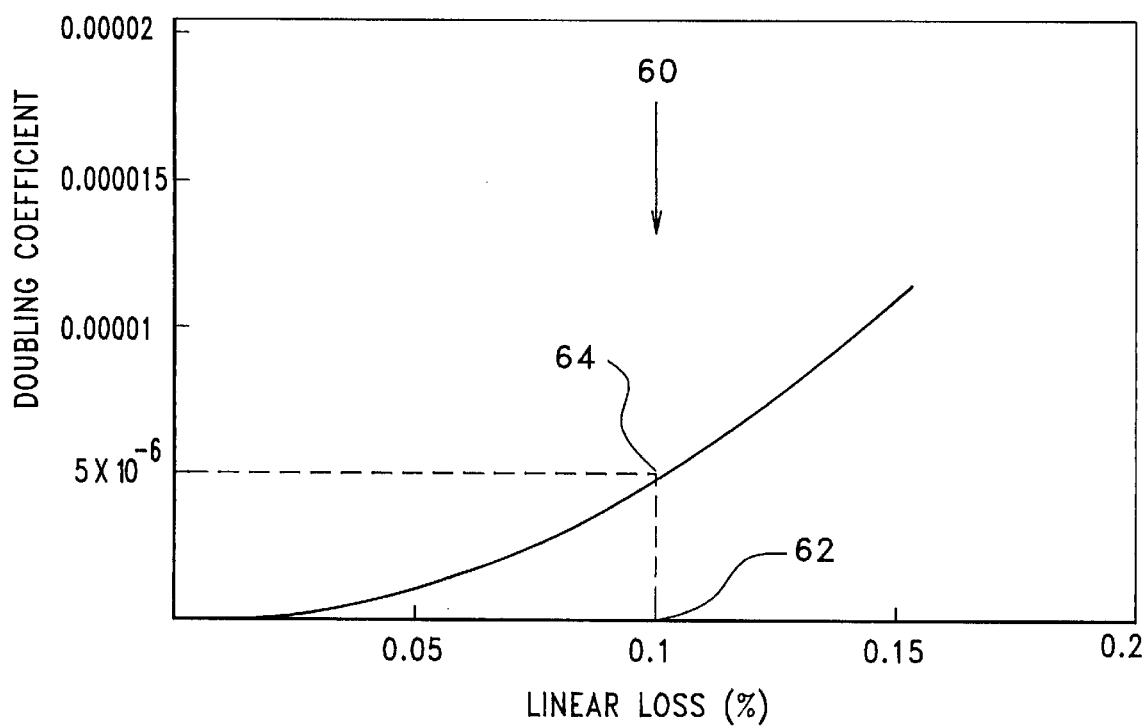
FIG. 4 is a graphical plot of the doubling coefficient ($W^{-1}$) of a nonlinear material versus the linear loss of the resonant cavity for the fundamental laser frequencies using a given beam waist and pump power, shown here to illustrate a step in the design of a laser in accordance with the present invention.

Turning now to FIG. 4, the threshold value (i.e., above which Inequality 1 is satisfied) of the doubling coefficient for a given value of laser gain medium extraction efficiency and pump power supplied by the pumping light source can be graphically determined by plotting Inequality 1 as an equation to yield a plot 60 of the doubling coefficient (vertical axis) as a function of the value of linear loss (horizontal axis). Plot 60 represents the curve for an actual laser with KTP used as the nonlinear material, a supplied pump power of 500 mW and beam waist of 80 $\mu$m. As mentioned previously, the value of linear loss is determined, at least in part by the particular mirror design and coatings used for the input and output mirrors. Moreover, one of skill in the art may establish a linear loss value for a particular laser configuration with relative ease. Having done that, the linear loss value can be located using curve 60. For example, if the linear loss for an exemplary laser is determined to be 0.1% at a point 62, a corresponding point 64 is found on curve 60. Projection onto the vertical, doubling coefficient axis then establishes a value for the doubling coefficient of approximately $5 \times 10^{-6}$/W. Therefore, for this laser, the doubling coefficient must be greater than $5 \times 10^{-6}$/W in order to satisfy the two-mode criterion.

Figure 5:
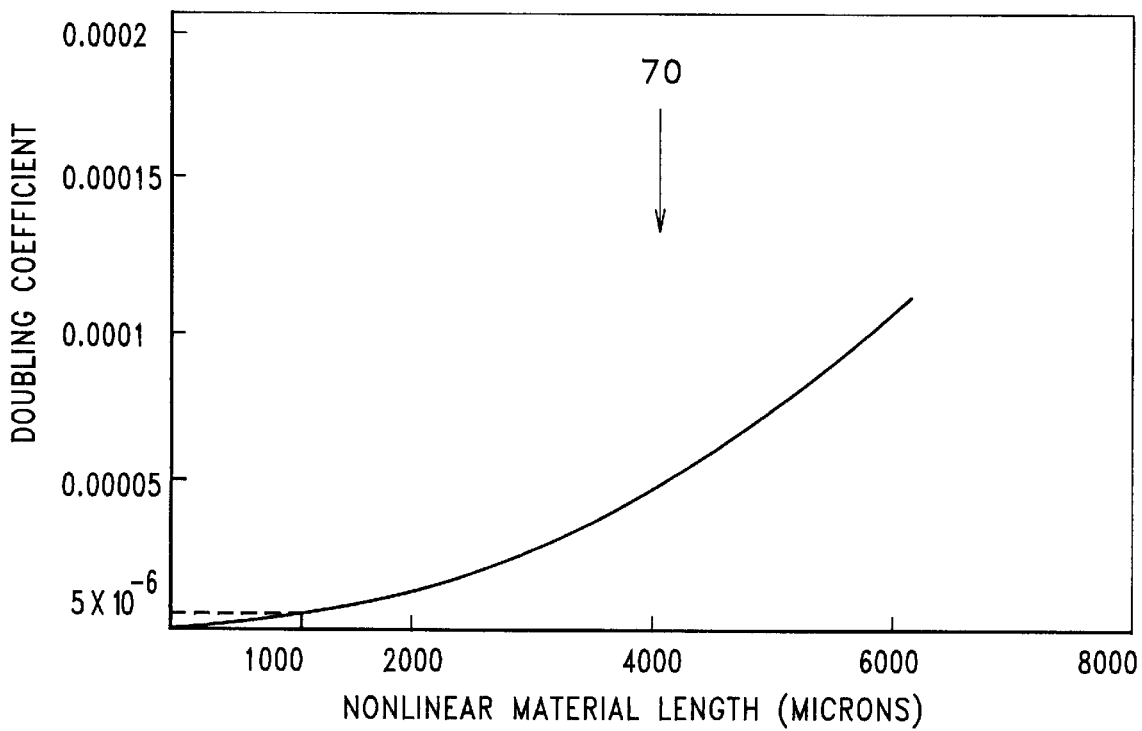
FIG. 5 is sa graphical plot of the doubling coefficient ($W^{-1}$) versus the nonlinear material (KTP) length ($\mu$m) required for a given linear loss, illustrating another step in the design of a laser in accordance with the present invention.

Referring to FIG. 5 and having found the threshold doubling coefficient, the minimum required nonlinear material length can then be calculated. (G. D. Boyd and D. A. Kleinman, "Parametric Interaction of Focused Gaussian Light Beams", Journal of Applied Physics 39, 3597, 1968). For KTP as in the present example, the minimal length can be found graphically by using a plot 70 of the value of the doubling coefficient (vertical axis) as a function of length (horizontal axis) for a given nonlinear material. Using the threshold value, $5 \times 10^{-6}$(W$^{-1}$), of the doubling coefficient, as determined using plot 60, the value for KTP length is projected on the horizontal axis of FIG. 5 as approximately 1 mm. Thus, for this working embodiment, the two-mode criterion is satisfied if the length of the nonlinear material is chosen to be greater than the threshold value 1 mm, such that the laser lases at only two fundamental frequencies whereby to produce an output beam having corresponding harmonic frequencies.

Having achieved consistent two-mode operation in a highly advantageous way using the two-mode criterion, certain other design aspects of the laser operation may be addressed. In particular, it has been found that, even though two-mode operation has been achieved, a substantially stable (i.e., low noise) light output at the harmonic frequencies is not necessarily provided. In accordance with the present invention, a highly advantageous two-mode stability criterion has been discovered. Specifically, in order to achieve low-noise operation (i.e., % RMS value of the output intensity variation less than 3%), the doubling coefficient must satisfy a stability criterion, defined as:

$$\epsilon < \frac{\tau_c \cdot (1 + \beta'_{21}) \cdot \sigma}{h \cdot v \cdot \pi \cdot w^2} \qquad (2)$$

It is noted that throughout this disclosure descriptions of previously introduced terms will not be repeated for purposes of brevity and the reader is referred to the initial descriptions of such terms. In inequality 2, $\epsilon$ is the doubling coefficient, $\tau_c$ is the cavity lifetime, $\beta'_{21}$ is a cross saturation term dependent upon the location of the gain material along the light path as described, $\sigma$ is the gain cross-section of the laser gain medium, h is Planck's constant, v is an average frequency of the fundamental frequencies, and w is the beam radius of the light at fundamental frequencies at a position where the light enters the nonlinear material. This condition can be derived by solving nonlinear laser dynamics equations. For the laser dynamics of two longitudinal modes, the following nonlinear rate equations apply:

$$\tau_c \frac{dP_1}{dt} = (\xi G_1 - \alpha_1 - \epsilon P_1 - 2\epsilon P_2) P_1 \qquad (3)$$

$$\tau_f \frac{dG_1}{dt} = -(\beta P_1 + \beta_{12} P_2 + 1)G_1 + G_1^0 \qquad (4)$$

$$\tau_c \frac{dP_2}{dt} = (\xi G_2 - \alpha_2 - \epsilon P_2 - 2\epsilon P_1) P_2 \qquad (5)$$

$$\tau_f \frac{dG_2}{dt} = -(\beta P_2 + \beta_{12} P_1 + 1)G_2 + G_2^0 \qquad (6)$$

Where $P_i(i=1,2)$ is the power of each fundamental mode i, $G_i(i=1,2)$ is the gain of each fundamental mode i, $$\xi = \frac{\tau_c}{2L_{\text{abs}}/c}$$

where $\tau_c$ is the cold cavity lifetime and $L_{abs}$ is the absorption depth of the gain medium, $\tau_f$ is the fluorescence lifetime, $\alpha_i(i=1,2)$ is the roundtrip linear loss for each fundamental lasing mode i, $\epsilon_i(i=1,2)$ is the roundtrip doubling coefficient for each fundamental lasing mode, $G_i^{(0)}(i=1,2)$ is the small signal gain for each fundamental lasing mode i, $\beta_{12}$ is a cross saturation parameter which is equal to $\beta'_{12} \cdot \beta$ and where:

$$\beta = \frac{1}{\left(\frac{hv}{\sigma \tau_f}\right) \pi \omega^2} \qquad (7)$$

wherein $\beta$ is the self-saturation parameter.

For example, for a 20 mm long laser cavity with 1% Nd:YVO$_4$, we have $\tau_c$=0.133 ns, $\tau_f$=90 $\mu$s, $\xi$=200, $\beta$=4(w$^{-1}$), and $\beta_{12}$=0.333×4=1.31(w$^{-1}$), the steady state solution $P_i^s$, $G_i^s$(i=1,2) of eq. 10–13 can be solved by letting the left hand sides of the equations 10–13 equal zero. That is, $$0 = (\xi G_1^s - \alpha_1 - \epsilon P_1^s - 2\epsilon P_2^s) P_1^s \qquad (8)$$

$$0 = -(\beta P_1^s + \beta_{12} P_2^s + 1)G_1^s + G_1^0 \qquad (9)$$

$$0 = (\xi G_2^s - \alpha_2 - \epsilon P_2^s - 2\epsilon P_1^s) P_2^s \qquad (10)$$

$$0 = -(\beta P_2^s + \beta_{12} P_1^s + 1)G_2^s + G_2^0 \qquad (11)$$

By defining $$P_1 = P_1^s + p_1 \qquad (12)$$

$$P_2 = P_2^s + p_2 \qquad (13)$$

$$G_1 = G_1^s + g_1 \qquad (14)$$

$$G_2 = G_2^s + g_2 \qquad (15)$$

and substituting them into equations 3–6, we can linearize the equations 3–6 to the first order of $p_i$, $g_i$(i=1,2).

$$\tau_c \frac{dp_1}{dt} = (\xi g_1 - \epsilon p_1 - 2\epsilon p_2) P_1^s \qquad (16)$$

$$\tau_f \frac{dg_1}{dt} = -(\beta p_1 + \beta_{12} p_2)G_1^s - (1 + \beta P_1^s + \beta_c P_2^s) g_1 \qquad (17)$$

$$\tau_c \frac{dp_2}{dt} = (\xi g_2 - \epsilon p_2 - 2\epsilon p_1) P_2^s \qquad (18)$$

$$\tau_f \frac{dg_2}{dt} = -(\beta p_2 + \beta_{12} p_1)G_2^s - (1 + \beta P_2^s + \beta_c P_1^s) g_2 \qquad (19)$$

The dynamics of variables $p_i, g_i$(i=1,2) can be evaluated by solving the eigenvalues of the linearized equations 16–19. If all the real part of the eigenvalues are negative, the system will be damped down to its steady state solution and be stable. If any real parts of the eigenvalues are positive, the system will oscillate and be unstable. Since the two longitudinal modes are closely spaced in the frequency spectrum and oscillate symmetrically with respect to the gain peak, we can assume $G_1^s = G_2^s, P_1^s = P_2^s, \alpha_1 = \alpha_2, \beta_{12} = \beta_{21}$ in order to simplify the equations. Inequality (2) can then be derived by letting the real parts of the eigenvalues be less than zero.

Figure 6:
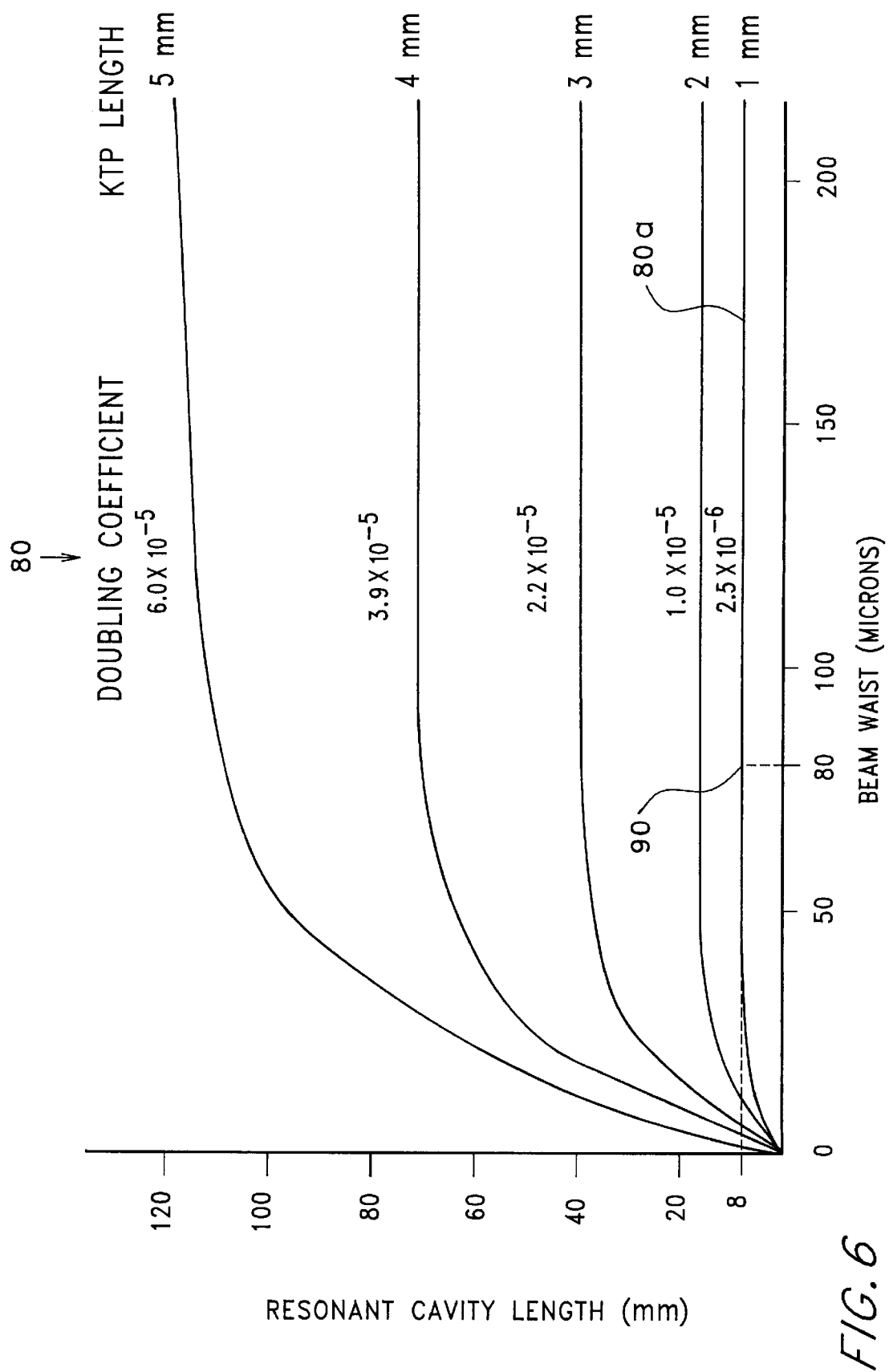
FIG. 6 is a graphical plot of the cavity length versus beam waist for various values of nonlinear material (KTP) length, illustrating still another step in the design of a laser in accordance with the present invention.

It should be appreciated that, irrespective of the way in which the stability criterion is satisfied, stable operation will result. In accordance with one advantageous design technique, given: (1) the value of the doubling coefficient (i.e., nonlinear material length), (2) location of the laser gain medium, (3) the gain cross-section (which is dependent upon the material chosen as the laser gain medium), (4) the fundamental frequencies, and (5) the beam radius, all values in Equation 2 are fixed except the cavity lifetime. The cavity lifetime can alternatively be expressed as:

$$\tau_c = \frac{2L}{c} \qquad (20)$$

where L is the length of the resonant cavity and c is the speed of light in a vacuum. Therefore, given a laser including a particular configuration of nonlinear material, configuration of laser gain medium material (i.e., fixing the doubling coefficient), and pump beam characteristics, the length of the resonant cavity can be determined by solving for L after substituting $$\frac{2L}{c}$$

for $\tau_c$ in the stability criterion. Referring to FIG. 6, in order to determine the length of the resonant cavity required to satisfy the stability criterion, a highly advantageous graphical approach can again be used. In FIG. 6, a series of plots 80 show cavity length (vertical axis) as a function of beam waist (horizontal axis) for various denoted values of nonlinear material length (corresponding doubling coefficients are also shown). These curves are generated by plotting threshold values (i.e., Inequality 2 converted to an equation) for different nonlinear material lengths.

Referring to FIG. 6, for a given value of beam radius and for a given KTP length, cavity length L which corresponds to a stability threshold value of resonant cavity length is determined using the appropriate plot 80, above which the stability criterion is satisfied. Thereafter, L is selected to be greater than the stability threshold value such that the stability criterion is satisfied. Continuing with the previous example in which the beam waist was 80 µm and the KTP length was determined to be 1 mm, lowermost curve 80a for a 1 mm KTP length is used to establish the minimum cavity length for stable output as approximately 8 mm.

In view of the foregoing descriptions, it is readily apparent that the present invention provides a stable, two-mode, laser. Moreover, a highly advantageous and heretofore unknown design protocol has been introduced which utilizes two specific relationships/criteria in a way which ensures: 1) two-mode operation at desired fundamental frequencies; and 2) highly stable output intensity at desired harmonic frequencies. As mentioned, the design criteria may be satisfied by adjusting parameters other than those described above within the scope of the present invention. Since the laser disclosed herein may be achieved in a variety of configurations and by modifying the disclosed method using a number of different techniques, it should be understood that the present invention may be embodied in many other specific forms without departing from the spirit or scope of the invention. Therefore, the present examples and methods are to be considered as illustrative and not restrictive, and the invention is not to be limited to the details given herein, but may be modified within the scope of the appended claims.

What is claimed is:

1. A laser, comprising:
   a) an input mirror and an output mirror defining a laser cavity and a light path having a length L in said cavity and between said mirrors such that any light traveling along said path is subjected to a linear loss;
   b) a laser gain medium positioned within said light path and substantially centered at a point between said mirrors for producing light at desired fundamental frequencies and at other, unwanted fundamental frequencies; and
   c) nonlinear means positioned within said light path for converting light from said fundamental frequencies to frequencies which are particular harmonics of said fundamental frequencies such that said fundamental frequencies incur a nonlinear loss, said nonlinear means being configured for establishing said nonlinear loss at a level which is greater than the linear loss such that two of said desired fundamental frequencies lase while said unwanted fundamental frequencies are extinguished.

2. The laser of claim 1 wherein said nonlinear means includes a nonlinear doubling coefficient which establishes said nonlinear loss, said nonlinear doubling coefficient being less than $$\frac{\tau_c(1+\beta'_{21})\sigma}{h \cdot v \cdot \pi \cdot w^2}$$

such that the laser produces an output beam at said harmonics which includes an intensity variation of less than 3% RMS, where $\tau_c$ is the cavity lifetime, $\beta'_{21}$ is a cross saturation coefficient dependent upon the location of said gain material along said light path, $\sigma$ is the gain cross-section of said laser gain medium, h is Planck's constant, v is an average frequency of said fundamental frequencies and w is the beam radius of said fundamental frequencies at a position where they enter said nonlinear means.

3. The laser of claim 1 wherein said particular harmonics are second harmonics of said fundamental frequencies.

4. The laser of claim 1 wherein said laser gain medium is excited by a pumping source and wherein said nonlinear means includes a doubling coefficient which is greater than $$\frac{2\delta_0^2}{\eta \cdot P_{pump}},$$

where $\delta_0$ is the linear loss incurred by said light at said fundamental frequencies, $\eta$ is the extraction efficiency of said laser gain medium and $P_{pump}$ is a light pumping power supplied by the pumping source.

5. The laser of claim 1 wherein said nonlinear means includes a length along said light path which establishes said nonlinear loss.

6. The laser of claim 1 wherein said laser gain medium is excited by a pumping source and wherein said nonlinear means includes a doubling coefficient $\epsilon$ such that $$\frac{2\delta_0^2}{\eta \cdot P_{pump}} < \epsilon < \frac{\tau_c(1+\beta'_{21})\sigma}{h \cdot v \cdot \pi \cdot w^2}$$

so that said laser produces an output beam including in output intensity at said harmonics having an RMS noise variation of less than 3%, where $\delta_0$ is the linear loss, $\eta$ is the extraction efficiency of said laser gain medium and $P_{pump}$ is a light pumping power supplied by said pumping source, $\tau_c$ is the cavity lifetime, $\beta'_{21}$ is a cross saturation coefficient established by the location of said gain material along said light path, $\sigma$ is the gain cross-section of said laser gain medium, h is Planck's constant, v is an average of said fundamental lasing frequencies, and w is the beam radius of said fundamental frequencies where they enter said nonlinear means.

7. A method of manufacturing a laser, said method comprising the steps of:
   a) providing an input mirror and an output mirror defining a laser cavity and a light path having a length L within said cavity and between said mirrors such that a linear loss is established for any light traveling along said path;
   b) positioning a laser gain medium in said light path substantially centered at a point between said mirrors for producing light at desired fundamental frequencies and at other, unwanted fundamental frequencies;
   c) locating nonlinear means within said light path for converting light from said fundamental frequencies to frequencies which are particular harmonics of said fundamental frequencies such that a nonlinear loss is established at said fundamental frequencies; and
   d) cooperatively configuring said nonlinear means and said length of the laser cavity in a way which establishes said nonlinear loss as being greater than said linear loss such that two of said desired fundamental frequencies lase.

8. The method of claim 7 wherein said nonlinear means includes a nonlinear doubling coefficient which establishes said nonlinear loss and including the step of configuring said nonlinear means such that said nonlinear doubling coefficient is less than $$\frac{\tau_c(1+\beta'_{21})\sigma}{h \cdot v \cdot \pi \cdot w^2},$$

where $\tau_c$ is the cavity lifetime, $\beta'_{21}$ is a cross saturation coefficient established by the location of said gain material along said light path, $\sigma$ is the gain cross-section of said laser gain medium, h is Planck's constant, v is an average frequency of said fundamental frequencies, and w is the beam radius of said fundamental frequencies where they enter said nonlinear means so that said laser produces an output beam at said harmonics including an output intensity having an RMS noise variation of less than 3%.

9. The method of claim 8 wherein $\sigma$, and $\beta'_{21}$, the nonlinear loss are fixed values based upon a predetermined configuration, said method further comprising the step of determining the value of L such that said nonlinear doubling coefficient is less than $$\frac{\frac{2L}{c}(1+\beta'_{21})\sigma}{h \cdot v \cdot \pi \cdot w^2},$$

where c is the speed of light.

10. The method of claim 7 wherein said particular harmonic frequencies are second harmonics of said fundamental frequencies.

11. The method of claim 7 wherein said laser gain medium is excited by a pumping source and including the step of designing said nonlinear means to include a doubling coefficient which is greater than $$\frac{2\delta_0^2}{\eta \cdot P_{pump}},$$

where $\delta_0$ is the linear loss, $\eta$ is the extraction efficiency of said laser gain medium and $P_{pump}$ is a light pumping power supplied by said pumping source.

12. The method of claim 11 wherein said nonlinear means includes a length along said light path which establishes said nonlinear loss and wherein said step for designing said nonlinear means includes the step of determining the length of the nonlinear means.

13. The method of claim 11 wherein said nonlinear means includes a length along said light path which establishes said nonlinear loss and wherein $P_{pump}$ is a fixed value, said method further comprising the step of determining the value of the length of said nonlinear means such that said nonlinear doubling coefficient is greater than $$\frac{2\delta_0^2}{\eta \cdot P_{pump}}.$$

14. The method of claim 7 wherein said laser gain medium is excited by a pumping source and including the step of designing said nonlinear means to include a doubling coefficient $\epsilon$ having a value such that $$\frac{2\delta_0^2}{\eta \cdot P_{pump}} < \epsilon < \frac{\tau_c(1+\beta'_{21})\sigma}{h \cdot v \cdot \pi \cdot w^2}$$

so that said laser produces an output beam at said harmonics including an output intensity having an RMS noise variation of less than 3%, where $\delta_0$ is the linear loss, $\eta$ is the extraction efficiency of said laser gain medium and $P_{pump}$ is a light pumping power supplied by said pumping source, $\tau_c$ is the cavity lifetime, $\beta'_{21}$ is a cross saturation coefficient established by the location of said gain material along said light path, $\sigma$ is the gain cross-section of said laser gain medium, h is Planck's constant, v is an average of said fundamental frequencies, and w is the beam waist of said fundamental frequencies where they enters said nonlinear means.

15. The method of claim 14 wherein said particular harmonic frequencies are second harmonics of said fundamental frequencies.

16. The method of claim 14 wherein $\sigma$, and $\beta'_{21}$, the nonlinear loss are fixed values based upon a predetermined configuration of said nonlinear means, said method further comprising the step of determining the value of L such that said nonlinear doubling coefficient is less than $$\frac{\frac{2L}{c}(1+\beta'_{21})\sigma}{h \cdot v \cdot \pi \cdot w^2},$$

where c is the speed of light.

17. In the construction of a laser comprising components including an input mirror, an output mirror, a laser gain medium and nonlinear means, wherein said laser gain medium generates more than two modes which are subjected to a linear loss by certain ones of said components and wherein said modes are subjected to a nonlinear loss by said nonlinear means, a method of ensuring that the laser operates in two modes selected from said plurality of modes, said method comprising the steps of:

a) positioning the various components relative to one another; and b) selecting sand components such that said nonlinear losses resulting from the operation of said laser are always greater than said linear losses.

18. The method of claim 17 wherein said laser gain medium is excited by a pumping source and wherein said nonlinear means includes a doubling coefficient, said selecting step including the step of selecting said nonlinear means such that its doubling coefficient is greater than $$\frac{2\delta_0^2}{\eta \cdot P_{pump}},$$

where $\delta_0$ is the linear loss incurred by said light at said fundamental frequencies, $\eta$ is the extraction efficiency of said laser gain medium and $P_{pump}$ is a light pumping power supplied by the pumping source.

* * * * *